(12) United States Patent
Scaff

(10) Patent No.: US 8,330,984 B2
(45) Date of Patent: Dec. 11, 2012

(54) FIELD METERING PATROL SYSTEM AND METHOD FOR METERING AND MONITORING PRINTERS

(75) Inventor: Marvin Scaff, Tampa, FL (US)

(73) Assignee: Emerge Paint Management, LLC, Tampa, FL (US)

( * ) Notice: Subject to any disclaimer, the term of this patent is extended or adjusted under 35 U.S.C. 154(b) by 446 days.

(21) Appl. No.: 12/726,979

(22) Filed: Mar. 18, 2010

(65) Prior Publication Data

US 2011/0228314 A1  Sep. 22, 2011

(51) Int. Cl.
- G06F 3/12 (2006.01)
- G06F 15/177 (2006.01)
- G06F 15/173 (2006.01)
- G06K 15/00 (2006.01)

(52) U.S. Cl. ............ 358/1.15; 358/1.13; 358/1.14; 709/220; 709/222; 709/224; 709/226

(58) Field of Classification Search ........ 358/1.13–1.15; 705/28; 709/220, 222, 224, 226
See application file for complete search history.

(56) References Cited

U.S. PATENT DOCUMENTS

| | | | |
|---|---|---|---|
| 5,214,772 A | 5/1993 | Weinberger et al. |
| 5,216,461 A | 6/1993 | Maekawa et al. |
| 5,220,380 A | 6/1993 | Hirata et al. |
| 5,224,157 A | 6/1993 | Yamada et al. |
| 5,243,382 A | 9/1993 | Takano et al. |
| 5,257,069 A | 10/1993 | Hirata et al. |
| 5,270,775 A | 12/1993 | Suzuki |
| 5,282,127 A | 1/1994 | Mii |
| 5,293,196 A | 3/1994 | Kaneko et al. |
| 5,300,980 A | 4/1994 | Maekawa et al. |
| 5,305,055 A | 4/1994 | Ebner et al. |
| 5,305,199 A | 4/1994 | LoBiondo et al. |
| 5,335,048 A | 8/1994 | Takano et al. |
| 5,339,168 A | 8/1994 | Evanitsky et al. |
| 5,347,346 A | 9/1994 | Shimizu et al. |
| 5,361,265 A | 11/1994 | Weinberger et al. |
| 5,365,310 A | 11/1994 | Jenkins et al. |
| 5,369,471 A | 11/1994 | Yamada |
| 5,373,349 A | 12/1994 | Ito |
| 5,384,622 A | 1/1995 | Hirata et al. |
| 5,386,271 A | 1/1995 | Maekawa et al. |
| 5,392,095 A | 2/1995 | Siegel |
| 5,398,257 A | 3/1995 | Groenteman |
| 5,404,199 A | 4/1995 | Hirata et al. |
| 5,412,779 A | 5/1995 | Motoyama |
| 5,414,494 A | 5/1995 | Aikens et al. |

(Continued)

FOREIGN PATENT DOCUMENTS

EP  1703674  9/2006

(Continued)

Primary Examiner — Twyler Haskins
Assistant Examiner — Jonathan Beckley
(74) Attorney, Agent, or Firm — Gray Robinson, P.A.

(57) ABSTRACT

A standalone printer monitoring device comprising a processing unit, a memory capable of communicating with the processing unit, a network interface interconnected to the processing unit wherein the network interface is configured to receive DC power over a network to power the device, a printer discovery engine configured to discover a plurality of printers on a network, a printer patrol engine configured to patrol the printers discovered by the printer discovery engine, and a reporting engine configured to report to a centralized repository information collected by the printer patrol engine.

3 Claims, 4 Drawing Sheets

U.S. PATENT DOCUMENTS

| | | | |
|---|---|---|---|
| 5,420,667 | A | 5/1995 | Kaneko et al. |
| 5,424,808 | A | 6/1995 | Maekawa et al. |
| 5,424,844 | A | 6/1995 | Koyanagi et al. |
| 5,428,551 | A | 6/1995 | Trainor et al. |
| 5,446,522 | A | 8/1995 | Tahara et al. |
| 5,459,552 | A | 10/1995 | Ohira |
| 5,488,454 | A | 1/1996 | Fukada et al. |
| 5,491,535 | A | 2/1996 | Hirata et al. |
| 5,493,364 | A | 2/1996 | Kuroyanagi et al. |
| 5,543,892 | A | 8/1996 | Hirata et al. |
| 5,548,376 | A | 8/1996 | Kikuno |
| 5,555,191 | A | 9/1996 | Hripcsak |
| 5,561,501 | A | 10/1996 | Honma |
| 5,594,529 | A | 1/1997 | Yamashita et al. |
| 5,600,403 | A | 2/1997 | Inoo |
| 5,603,060 | A | 2/1997 | Weinberger et al. |
| 5,619,024 | A | 4/1997 | Kolls |
| 5,631,724 | A | 5/1997 | Sawada et al. |
| 5,636,008 | A | 6/1997 | Lobiondo et al. |
| 5,673,190 | A | 9/1997 | Kahleck et al. |
| 5,677,775 | A | 10/1997 | Yamaguchi et al. |
| 5,694,528 | A | 12/1997 | Hube |
| 5,708,908 | A | 1/1998 | Hirata et al. |
| 5,708,909 | A | 1/1998 | Yamashita et al. |
| 5,752,125 | A | 5/1998 | Yamashita et al. |
| 5,752,128 | A | 5/1998 | Yamashita |
| 5,787,149 | A | 7/1998 | Yousefi et al. |
| 5,787,278 | A | 7/1998 | Barton et al. |
| 5,801,964 | A | 9/1998 | McCarthy |
| 5,812,874 | A | 9/1998 | Yamashita et al. |
| 5,822,221 | A | 10/1998 | Groenteman |
| 5,844,550 | A | 12/1998 | Trainor et al. |
| 5,873,009 | A | 2/1999 | Yamashita et al. |
| 5,890,029 | A | 3/1999 | Hirata et al. |
| 5,894,416 | A | 4/1999 | Kuroyanagi |
| 5,897,235 | A | 4/1999 | Honma |
| 5,911,095 | A | 6/1999 | Atsumi et al. |
| 5,933,675 | A | 8/1999 | Sawada et al. |
| 5,956,698 | A | 9/1999 | Lacheze et al. |
| 6,006,045 | A | 12/1999 | Miyawaki |
| 6,009,284 | A | 12/1999 | Weinberger et al. |
| 6,031,964 | A | 2/2000 | Anderson |
| 6,064,915 | A | 5/2000 | Kaneko et al. |
| 6,091,915 | A | 7/2000 | Takagishi |
| 6,108,492 | A | 8/2000 | Miyachi |
| 6,112,035 | A | 8/2000 | Kuroyanagi et al. |
| 6,119,934 | A | 9/2000 | Kolls |
| 6,122,463 | A | 9/2000 | Nagatani |
| 6,152,365 | A | 11/2000 | Kolls |
| 6,181,331 | B1 | 1/2001 | Trainor et al. |
| 6,282,383 | B1 | 8/2001 | Weinberger et al. |
| 6,310,692 | B1 | 10/2001 | Fan et al. |
| 6,430,711 | B1 | 8/2002 | Sekizawa |
| 6,457,038 | B1 | 9/2002 | Defossé |
| 6,601,159 | B1 | 7/2003 | Smith et al. |
| 6,604,212 | B2 | 8/2003 | Sekizawa |
| 6,681,349 | B2 | 1/2004 | Sekizawa |
| 6,710,893 | B1 | 3/2004 | Hou et al. |
| 6,757,714 | B1 | 6/2004 | Hansen |
| 6,925,335 | B2 | 8/2005 | May et al. |
| 7,010,502 | B1 | 3/2006 | Hoshizawa et al. |
| 7,010,594 | B2 | 3/2006 | Defossé |
| 7,013,337 | B2 | 3/2006 | Defosséet al. |
| 7,020,680 | B2 | 3/2006 | Defossé |
| 7,117,239 | B1 | 10/2006 | Hansen |
| 7,139,616 | B2 | 11/2006 | May et al. |
| 7,149,792 | B1 | 12/2006 | Hansen et al. |
| 7,164,884 | B2 | 1/2007 | Defosséet al. |
| 7,167,892 | B2 | 1/2007 | Defosséet al. |
| 7,171,451 | B2 | 1/2007 | Defossé |
| 7,178,149 | B2 | 2/2007 | Hansen |
| 7,181,501 | B2 | 2/2007 | Defossé |
| 7,185,014 | B1 | 2/2007 | Hansen |
| 7,190,478 | B2* | 3/2007 | Caffary et al. .............. 358/1.15 |
| 7,334,520 | B2 | 2/2008 | Geissler et al. |
| 7,383,359 | B2 | 6/2008 | Motoyama et al. |
| 7,383,474 | B2 | 6/2008 | Sekizawa |
| 7,433,607 | B2 | 10/2008 | Thomas |
| 7,519,000 | B2 | 4/2009 | Caveney et al. |
| 7,577,996 | B1 | 8/2009 | Merchant et al. |
| 7,650,519 | B1* | 1/2010 | Hobbs et al. .................. 713/300 |
| 7,752,472 | B2* | 7/2010 | Diab et al. .................... 713/310 |
| 2003/0174356 | A1 | 9/2003 | Cherry et al. |
| 2004/0019671 | A1 | 1/2004 | Metz |
| 2004/0252329 | A1 | 12/2004 | Sorenson |
| 2005/0097198 | A1* | 5/2005 | Getler et al. ................. 709/223 |
| 2005/0286068 | A1 | 12/2005 | Johnson et al. |
| 2006/0288101 | A1* | 12/2006 | Mastrodonato et al. ...... 709/224 |
| 2007/0273922 | A1 | 11/2007 | Matsugashita |
| 2008/0025008 | A1 | 1/2008 | Kochis et al. |
| 2008/0037057 | A1 | 2/2008 | Caffary, Jr. |
| 2008/0259103 | A1 | 10/2008 | Lapstun et al. |
| 2008/0304095 | A1 | 12/2008 | Saito |
| 2008/0309966 | A1 | 12/2008 | Scaff |
| 2008/0317021 | A1* | 12/2008 | Ives et al. ...................... 370/389 |
| 2008/0320099 | A1 | 12/2008 | Bahn et al. |
| 2009/0147299 | A1 | 6/2009 | Tetu |
| 2010/0235487 | A1* | 9/2010 | Guthery ........................ 709/223 |

FOREIGN PATENT DOCUMENTS

| | | |
|---|---|---|
| JP | 20011265546 | 9/2001 |
| JP | 20071114853 | 5/2007 |
| JP | 20071279834 | 10/2007 |

\* cited by examiner

Fig. 1
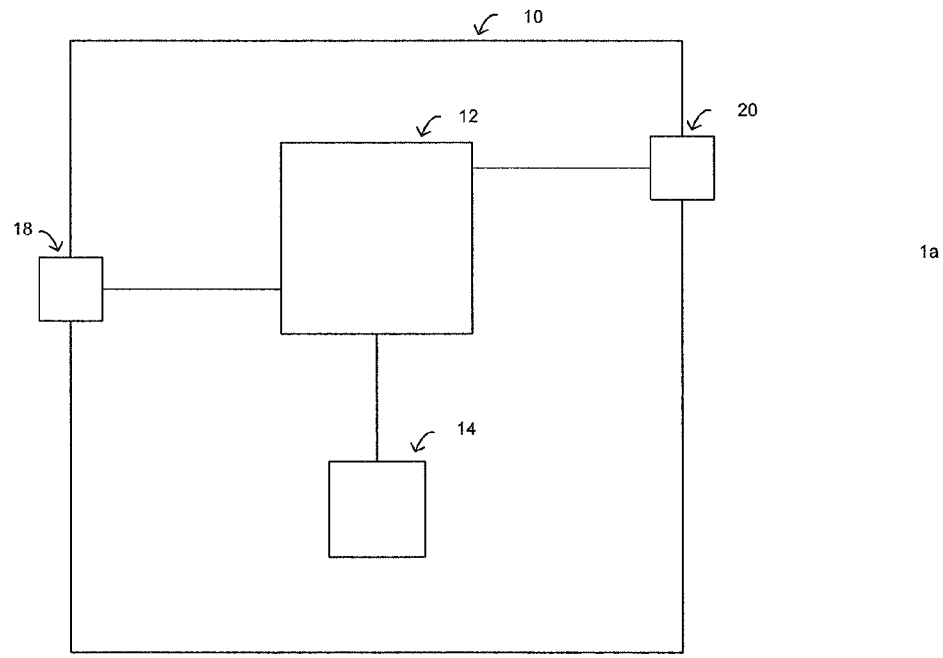
1a
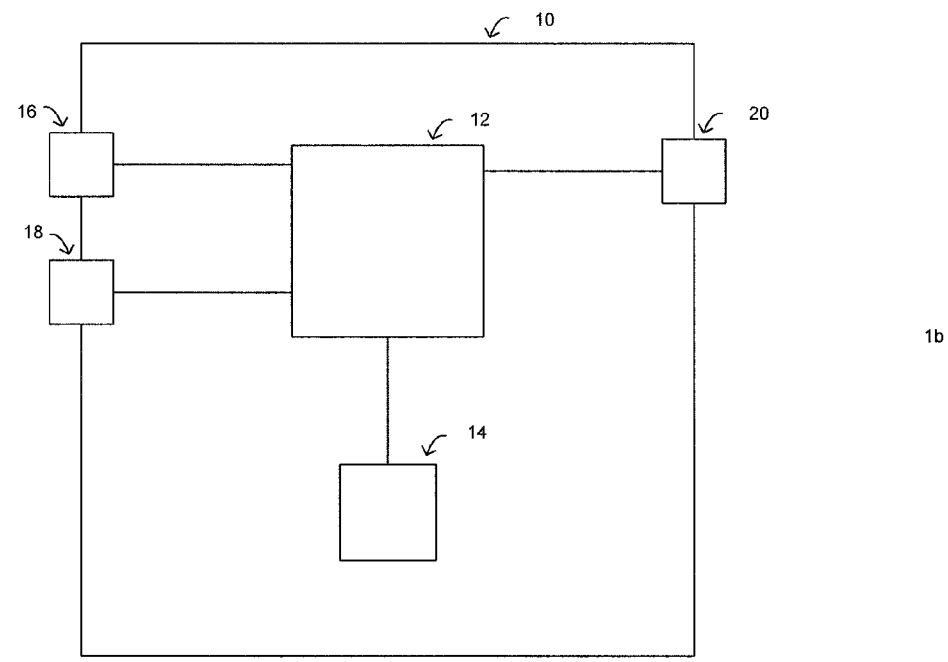
1b

FIELD METERING PATROL SYSTEM AND METHOD FOR METERING AND MONITORING PRINTERS

BACKGROUND OF THE INVENTION

1. Field of the Invention

This disclosure relates to a standalone apparatus and method for monitoring printers within an enterprise and for reporting the monitored information to a centralized repository.

2. Description of the Background Art

Computer networks typically include peripherals, such as printers, connected to the computer systems. Measures currently exist for monitoring and reporting on the status and performance of those systems. For example, U.S. patent application Ser. No. 11/812,017, owned by the applicant, discloses an apparatus and method for discovering printers within an enterprise. That system discloses an apparatus and methods for discovering printers in a network setting, monitoring those printers for things such as print counts and service requirements. That system allows for accurate service of all the printers in an enterprise by allowing discovery of networked printers as well as non-networked printers.

These systems, while capable of monitoring an enterprise's printing resources, are typically software systems that are installed on existing workstations or laptops. Alternatively, enterprises are required to acquire, maintain and service separate workstations that can run the printer management software. This creates problems when those separate systems are disabled for different reasons. For instance, where the printer monitor software is installed on a workstation, that workstation needs to be left on or otherwise enabled to function. If it the workstation is shut down overnight (for instance, when the primary user of the workstation goes home), it is unable to perform its printer monitoring tasks during this period of inoperability.

What is needed, therefore, is a standalone apparatus for collecting, monitoring and reporting printer usage and service information for networked and non-networked printers within an enterprise. The standalone apparatus would further benefit from receiving all of its electrical needs via the same networking connection it uses to connect to the network for discovering, collecting, and monitoring printer information.

The foregoing has outlined some of the pertinent objects of the disclosure. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this disclosure, this disclosure comprises a standalone, networked attached printer device monitor which receives its power via its network connection, discovers network accessible printers, monitors the discovered printers, and reports information monitored concerning the printers.

The disclosure herein benefits from its ability to draw all of its needed power over its network interface, eliminating the need to install and maintain the printer monitoring software on other computing resources.

Various other embodiments of the invention may have none, some, or all of the advantages discussed herein. Other technical advantages of the present disclosure will be readily apparent to one skilled in the art.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 illustrates preferred embodiments of an apparatus described in the present disclosure.

Similar reference characters refer to similar parts throughout the several views of the drawings.

DETAILED DESCRIPTION OF THE PREFERRED EMBODIMENT

Figure 2:
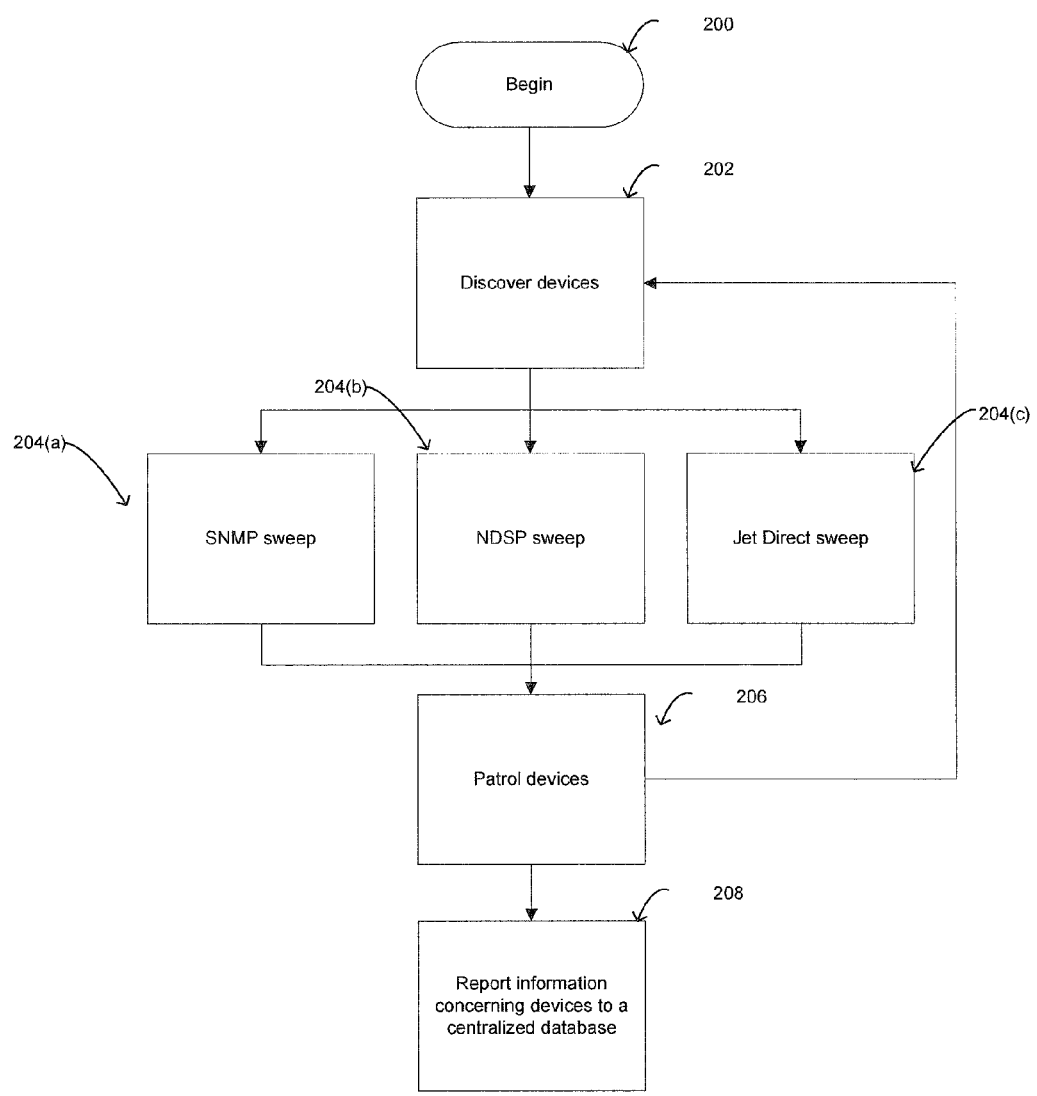
FIG. 2 illustrates steps implemented in an embodiment of the present disclosure.
Figure 3:
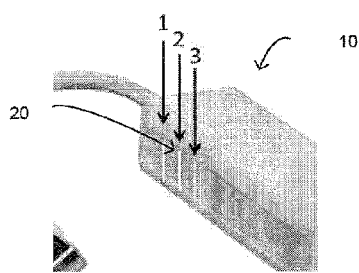
FIG. 3 depicts an embodiment of an apparatus described in the present disclosure.

FIG. 1 consists of FIGS. 1a and 1b. FIG. 1a is a high-level diagram depicting a preferred architecture for the device 10 described herein. In a preferred embodiment, the device 10 may comprise a microcontroller 12, memory 14, a network interface 18 and status indicator 20. In an alternative embodiment, depicted in FIG. 1b, the device can also include a configuration interface 16.

The microcontroller 12 can be any computer controller capable of performing the operations as described herein. In one embodiment, the microcontroller 12 may be a 32-bit reduced instruction set computer (RISC), such as the Cortex-M3 from ARM®. These processors, and others like them, are particularly suited for use as described herein because of their low cost, lower power needs and performance capabilities.

The memory 14 can be any computer memory suitable for use as described herein. For instance, memory could be SRAM (Static Random Access Memory), DRAM (Dynamic Random Access Memory), and/or Flash memory.

In a preferred embodiment, the device 10 is configured via its network interface 18. The device 10 can run configuration software, such as a network daemon (for instance, telnetd, ftpd, or a web server) so that it can receive network connections. Thus, once the device 10 is connected to a network, a user attempting to configure the device 10 can use the network interface 18 to communicate with the device 10 to configure it.

The network interface 18 enables the device 10 to connect to a network and to receive power via the network. In a preferred embodiment, the network interface 18 is an Ethernet interface, capable of connecting the device 10 to a network via Ethernet. In a preferred embodiment, the Ethernet network can be 10/100 MBs running over copper twisted pair wires. The Ethernet network can also be a gigabit Ethernet network. Importantly, the Ethernet network must be capable of providing Power over Ethernet.

IEEE standard 802.3af-2003 describes a preferred specification for Power over Ethernet (PoE) Pursuant to this specification, devices connected to such networks can be powered using a voltage between 44-57 V DC. The standard describes two types of devices: power sourcing equipment (PSE) and powered devices (PD). The device 10 described herein is a powered device. Recent amendments to the standard (IEEE 802.3at-2009) have enhanced the standard for various benefits which may be utilized herein.

The device 10 is capable of receiving all of its electrical supply via the network interface 18. As such, the device 10 can be operated in a set-it and forget-it manner, whereby the device 10 is connected to a network via the network interface 18, without need for any other connection for the device to operate properly.

In an alternative embodiment, the device 10 includes a configuration interface 16. The configuration interface 16 may be used for connecting the device 10 to other computer resources for configuration operations and the like. In one preferred embodiment, the configuration interface is a Universal Serial Bus (USB) interface.

The device 10 may also include status indicator 20. The status indicator 20 may be an LED or a plurality of LEDs capable of displaying different information to an observer based, for instance, on the color of the LED. For example, in one embodiment, an LED status indicator 20 may display a first color indicating it has successfully connected to the network, a second color indicating it has successfully connected to the centralized respository (discussed below), a third color indicating that it is properly receiving power via the Ethernet interface 18, and a fourth color indicating a problem. As would be appreciated by one of skill in the art, any other combination of information could be displayed. In another embodiment, the status indicator 20 may be a LCD display or any other component capable of displaying status information to an observer.

The device 10 is operated simply by plugging it into the network via the network interface 18. Once plugged in, the device 10 preferably verifies that it is receiving power. The device 10 can display a status in the status indicator 20 informing the operator whether or not the power supply is proper. The device 10 next determines (and informs the operator via the status indicator 20) whether it can receive an IP address in the network. In a preferred embodiment, the device 10 requests an IP address via the Dynamic Host Configuration Protocol, and is assigned an IP address by a computer responsible for assigning such addresses. Alternatively, the device 10 can be configured to use a static IP address.

Once the device 10 has networking capabilities, the device verifies that it can communicate with the centralized repository 30. Preferably, the communication between the device 10 and centralized repository 30 requires the device 10 to first authenticate itself with the centralized repository 30. For instance, the centralized repository 30 could maintain a list of approved devices 10. This list of approved devices 10 could be in the form of a list of pre-selected Media Access Control (MAC) addresses that are approved to communicate with the centralized repository 30. Any other suitable authentication mechanism would suffice. As would be evident to one of skill in the art, the communication between the device 10 and centralized repository 30 would preferably be a secured communication, such as an encrypted communication. The device 10 could also use the status indicator 20 to inform the operator whether or not it could connect to the centralized repository 30.

Turning to FIG. 2, the device's 10 method of operation is described. In a preferred embodiment, the device 10 is utilized for monitoring printing devices (i.e. printers connected directly to a network, as well as printers not connected to the network). As such, the discussion below is in terms of discovering, monitoring and reporting on printing devices, but the device 10 is also envisioned to be utilized with other network-connectable devices.

Once connected to the network, the device 10 begins searching for printers to monitor as depicted at step 202. As shown, this search can be done in three different passes. First, the device 10 can perform a scan according to the Simple Network Monitoring Protocol (SNMP), shown at step 204(a). During this step, the SNMP scan obtains all available IP addresses for each printer attached to the network. Additionally, the scan can collect printer-related information, such as a print count associated with the printer, and other information. The SNMP scan enables the discovery process to obtain information for the majority of printers on the network, and enables the discovery process to collect complete Management Information Base (MIB) information on those printers. When the device 10 encounters a printer device that the device 10 is not familiar with, it can contact the central repository 30 to acquire an appropriate MIB for that new printer device. The device 10 can then store this information (for instance, which printers exist on the network) to use later in patrolling these printers (discussed below) for gathering data pertaining to the discovered printers.

As a further scan step 204(b), a Non-Shared Desktop Printer (NDSP) scan can be performed. This is a sweep of all IP addresses for NSDP agents. The device 10, during this discovery phase, can receive and interpret the information provided by the NSDP agents it discovers on the network to determine which printers the responding devices interact with. The device 10 can then store this information along with (or separately from) the information gathered through the SNMP scan.

As another scan step 204(c), the device 10 can perform a Jet Direct sweep of all IP addresses to harvest IP addresses where printers can be located. Again, this information can be stored by the device 10 for later patrolling.

These scans can be performed sequentially or in parallel. Additionally, other scans are possible and considered within the scope of this disclosure. In a preferred embodiment utilizing sequential searching, the SNMP scan 204(a) is performed first because it can be the most effective scan option. The NDSP scan 204(b) would preferably be next, as the majority of printers that are not discovered using an SNMP scan are non-shared desktop printers, which may be revealed by an NDSP scan.

Once the printer scan begins, and at least a single printer is discovered, the device 10 can begin to patrol the devices. During this patrolling step 206, the device 10 can monitor various criteria of the discovered printers. For instance, the device 10 can periodically poll the discovered printers to gather print counts information, or gather service-related information (such as toner level). This patrolling process can begin while the device 10 continues to discover additional printers, or the patrolling process can begin after the printer discovery process ends.

Figure 4:
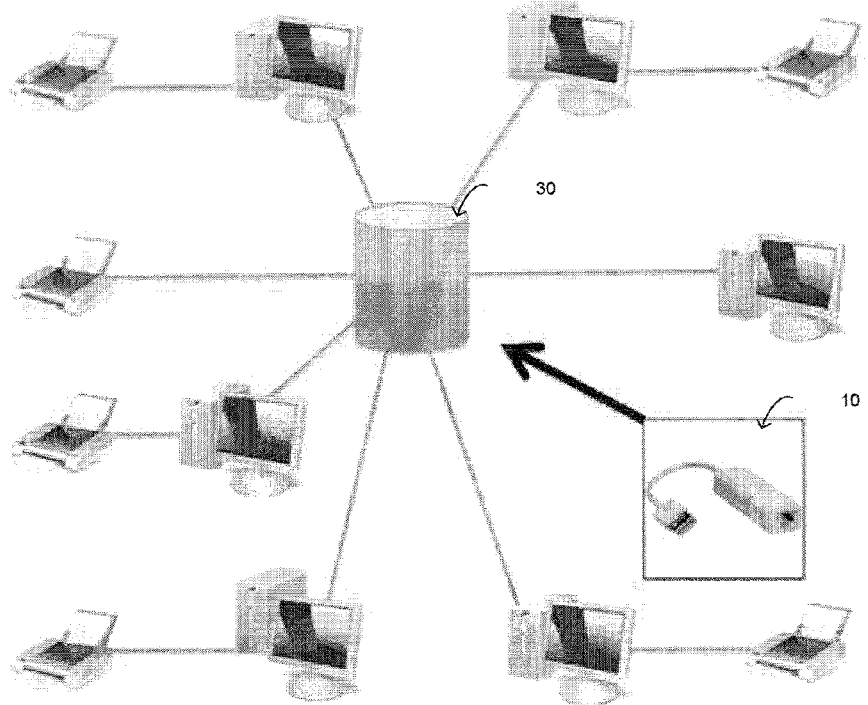
FIG. 4 illustrates an embodiment of a network of printers utilized in combination with the present disclosure.
Figure 5:
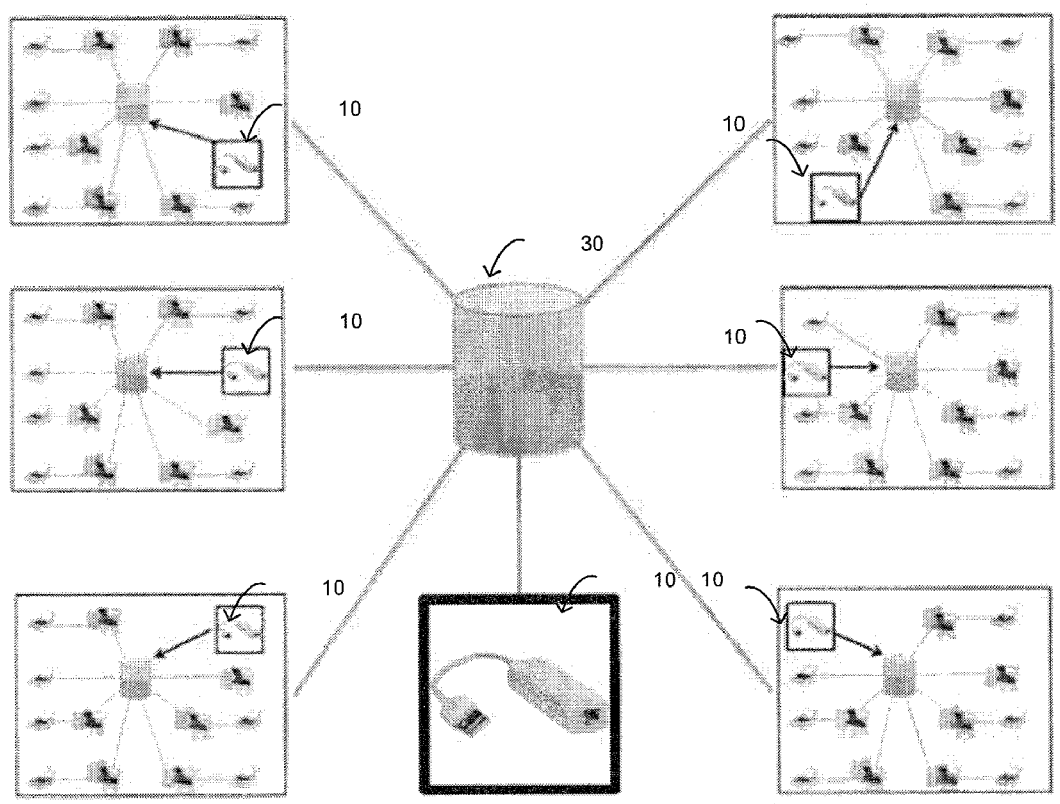
FIG. 5 illustrates an embodiment of a network of printers utilized in combination with the present disclosure.

The device 10 next reports the gathered information to a centralized repository 30, as depicted in FIGS. 4 and 5. The information stored in the centralized repository 30 can be mined in any fashion deemed appropriate. In one embodiment, the centralized repository 30 is individualized to the particular enterprise or individual using the device 10. In another embodiment, the centralized repository 30 is shared by a number of individuals and enterprises. In an example of such an embodiment an entity charged with servicing a wide variety of printer devices amongst a number of clients could install devices 10 at the respective client sites and maintain a centralized repository 30 which the devices 10 each report back to. Thus, the entity charged with servicing the printer devices can monitor the performance of the deployed printers, as well as handle other tasks such as billing for printer usage.

As shown in FIG. 2, the device 10 can re-initiate the discovery process 202 at any time in order to maintain a current view of the network topology. In one embodiment, the device 10 performs the discovery process 202 on set intervals, such as once a day. In another embodiment, the device 10 performs the discovery process 202 upon receiving an instruction to do so.

Additionally, because of its limited components, and thus limited cost, the device 10 can be utilized in large enterprises with hundreds or thousands of printer devices as well as small enterprises with as little as a single printer device that needs monitoring.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A standalone printer monitor for monitoring printers on a powered network, comprising:
   a processing unit;
   wherein the processing unit including:
      a memory for storing information about the printers on the powered network;
      a printer discovery engine for discovering a plurality of printers on the network,
      wherein the printer discovery engine executes a network scan on the network to discover a plurality of printers on the network;
      a printer patrol engine for patrolling the discovered plurality of printers; and
      a reporting engine for reporting patrolling information obtained by the printer patrol engine to a centralized repository;
   a Universal Serial Bus interface interconnected to the processing unit;
   a status indicator interconnected to the processing unit;
   an Ethernet network interface interconnected to the processing unit wherein the Ethernet network interface is configured to receive power over the network to power the monitor via Power over Ethernet; and
   a standalone housing;
   wherein the Universal Serial Bus interface, the status indicator, the processing unit, and Ethernet network interface being mounted within the standalone housing; and
   wherein the patrolling information includes an IP address of the monitor, a count of printers discovered by the monitor, information about discovered printers and a device ID of the monitor.

2. The monitor as in claim 1 wherein the network scan is a simple network management protocol scan.

3. The monitor as in claim 1 wherein the network scan is a scan of at least one internet protocol address on the network via the Non-Shared Desktop Printer.

* * * * *